United States Patent
Yamamoto

(10) Patent No.: US 6,715,054 B2
(45) Date of Patent: Mar. 30, 2004

(54) DYNAMIC REALLOCATION OF PHYSICAL STORAGE

(75) Inventor: Akira Yamamoto, Cupertino, CA (US)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/860,394

(22) Filed: May 16, 2001

(65) Prior Publication Data
US 2002/0174315 A1 Nov. 21, 2002

(51) Int. Cl.⁷ .............................. G06F 12/00
(52) U.S. Cl. .............. 711/170; 711/112; 711/114
(58) Field of Search ................ 711/170, 112, 711/114

(56) References Cited

U.S. PATENT DOCUMENTS

| | | | |
|---|---|---|---|
| 6,108,750 A | * 8/2000 | Yamamoto | 711/112 |
| 6,233,607 B1 | * 5/2001 | Taylor | 709/217 |
| 6,341,333 B1 | * 1/2002 | Schreiber | 711/114 |
| 6,405,284 B1 | * 6/2002 | Bridge | 711/114 |
| 6,415,366 B1 | * 7/2002 | Chen | 711/158 |
| 6,442,650 B1 | * 8/2002 | Bachmat | 711/114 |
| 6,535,954 B2 | * 3/2003 | Obara et al. | 711/114 |

\* cited by examiner

Primary Examiner—Kimberly McLean-Mayo
(74) Attorney, Agent, or Firm—Townsend and Townsend and Crew LLP

(57) ABSTRACT

A storage system includes a physical storage system in the form of a number of disk storage units and a controller unit that handles data transfers between the disk storage units and one or more host data processing systems. Data is stored in mirrored fashion so that multiple copies of the data are available for fault tolerance and enhanced performance. The controller unit implements a logical volume management system that includes a plurality of logical volumes, each of which map to corresponding areas of storage of the disk storage units, thereby parsing the available physical storage. Received I/O write and read requests are assigned to one or another of the logical volumes, and therethrough data is written to or read from the corresponding disk storage unit or units. Usage of the disk storage units is monitored by the controller, and if one or more are found to be over-utilized, the number of logical volumes is increased to more finely parse the physical storage. Conversely, if the controller unit determines that one or more of the physical storage units are under-utilized, the number of logical volumes is decreased.

16 Claims, 7 Drawing Sheets

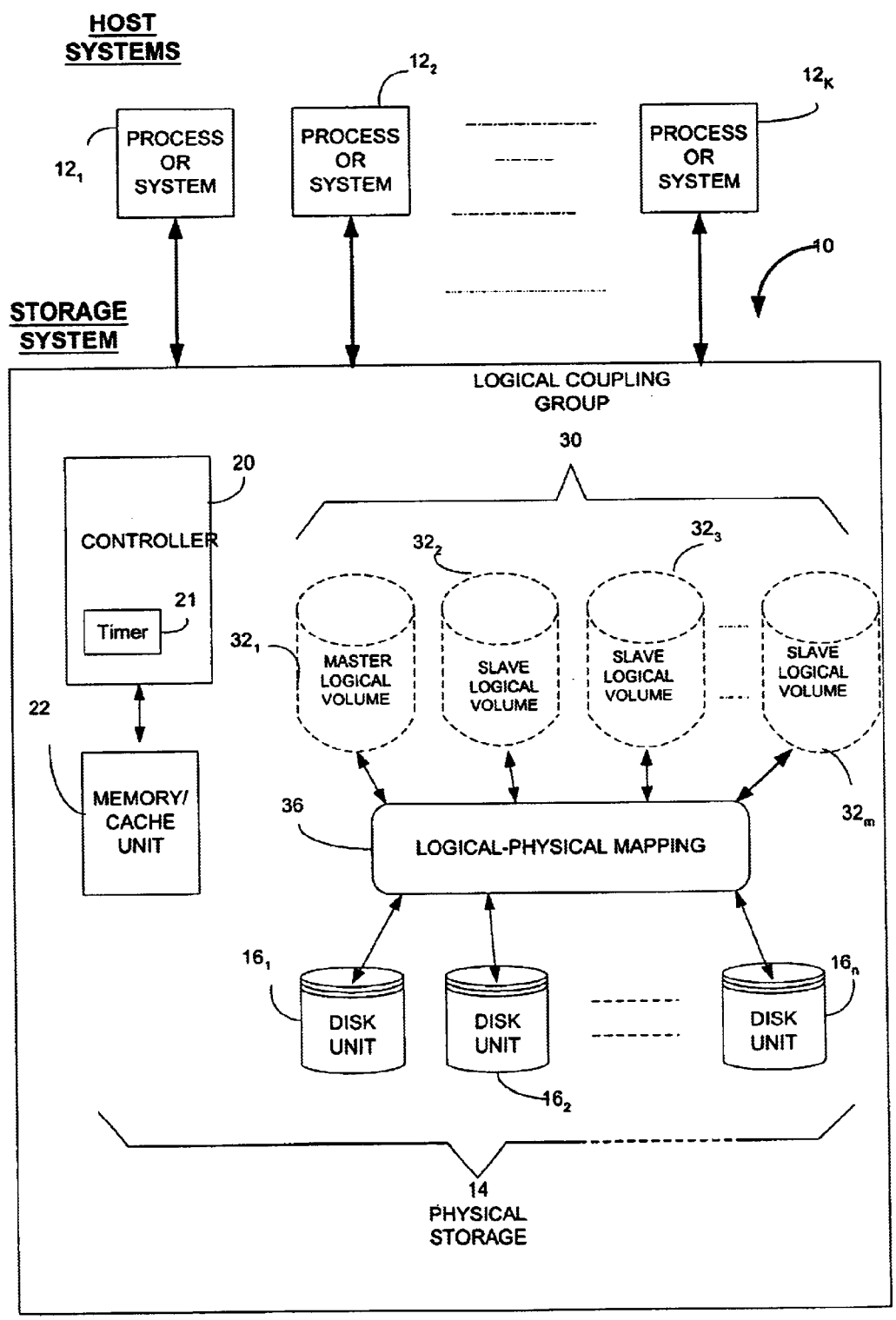
FIG_1

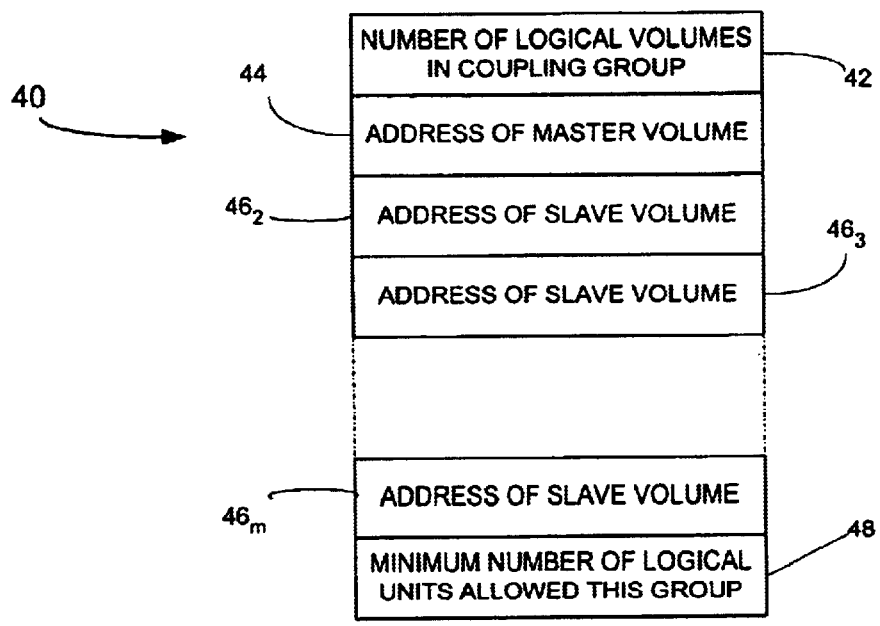
Fig_2
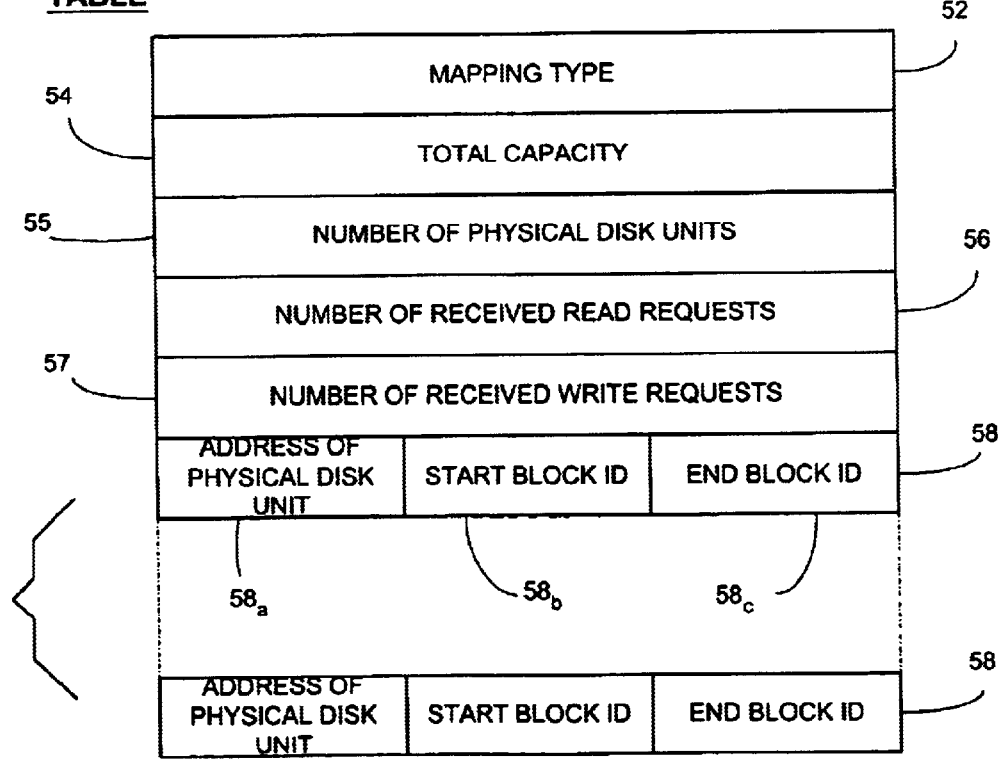
Fig_3

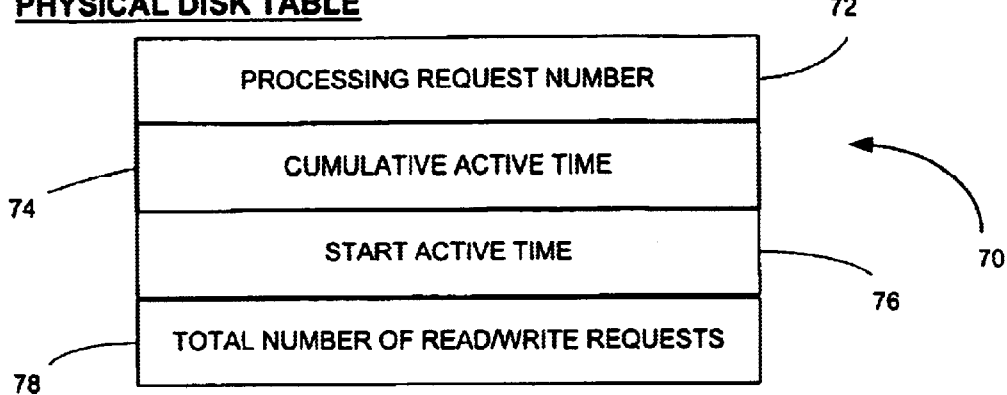
Fig_4
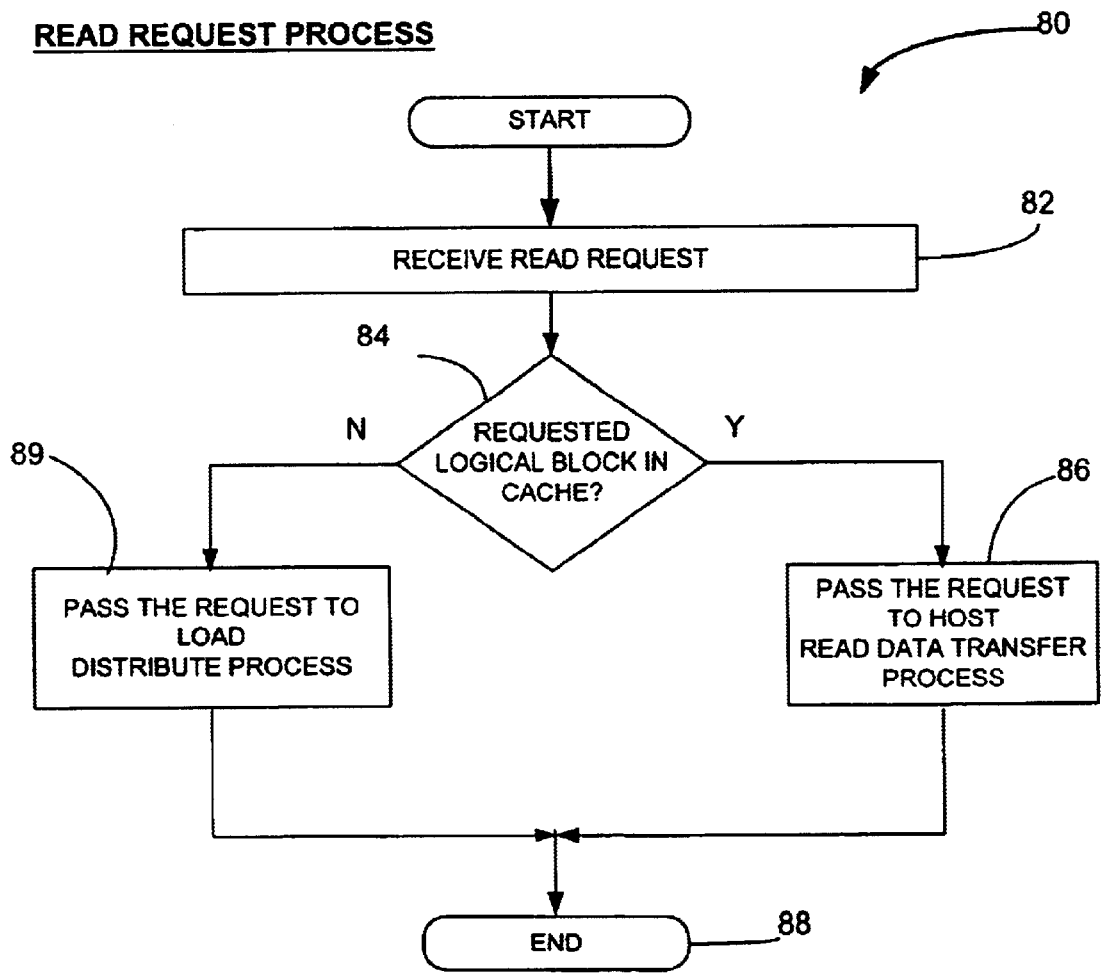
Fig_5

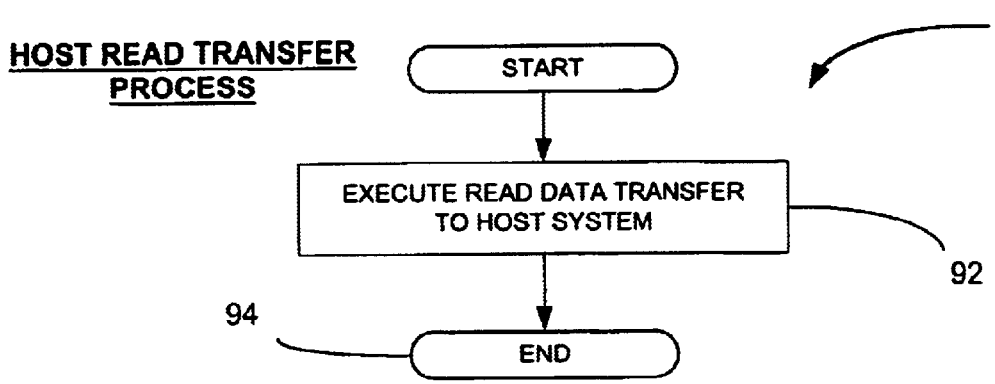
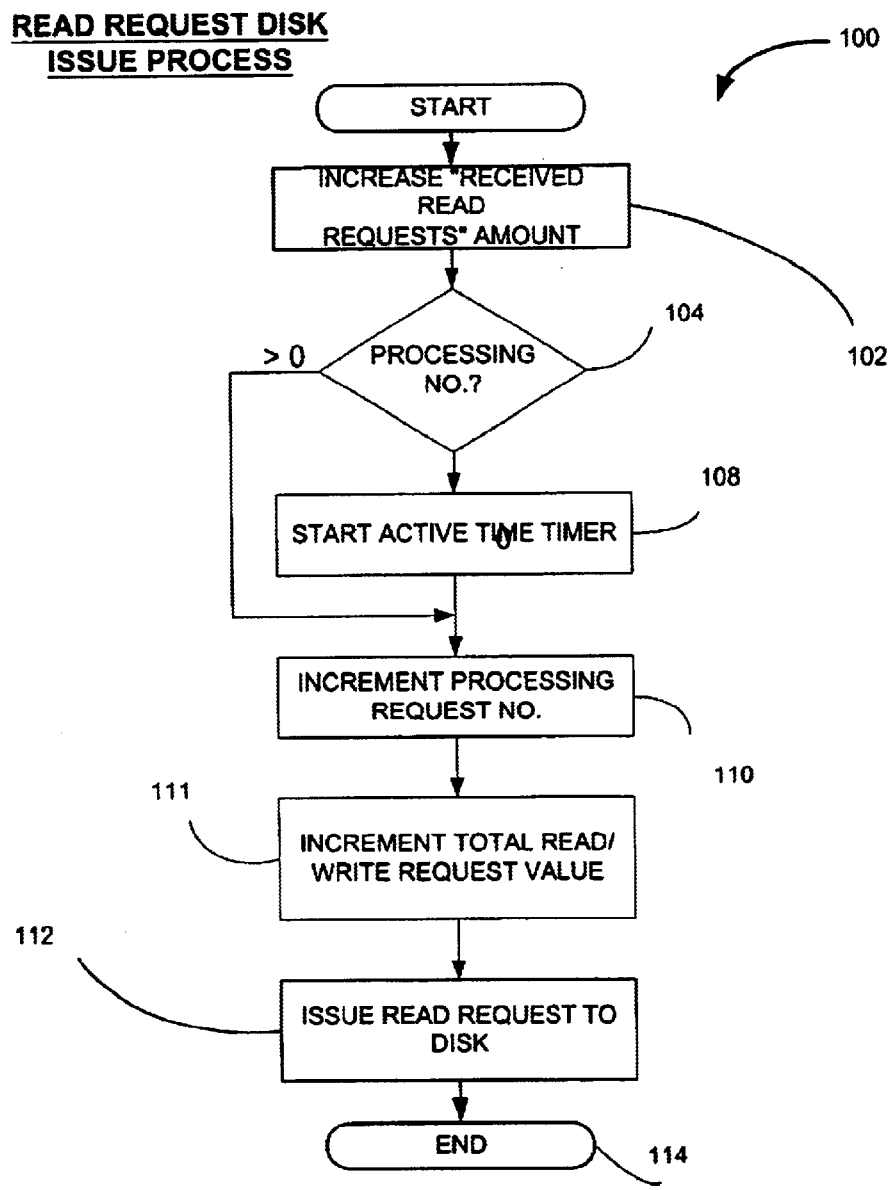

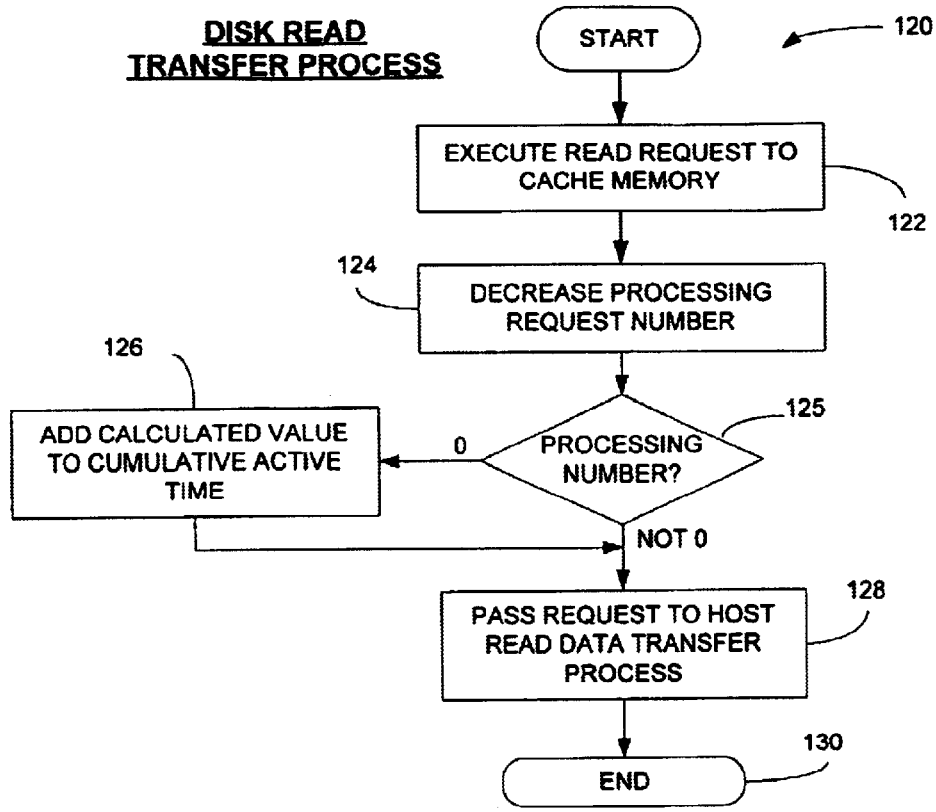
FIG_8
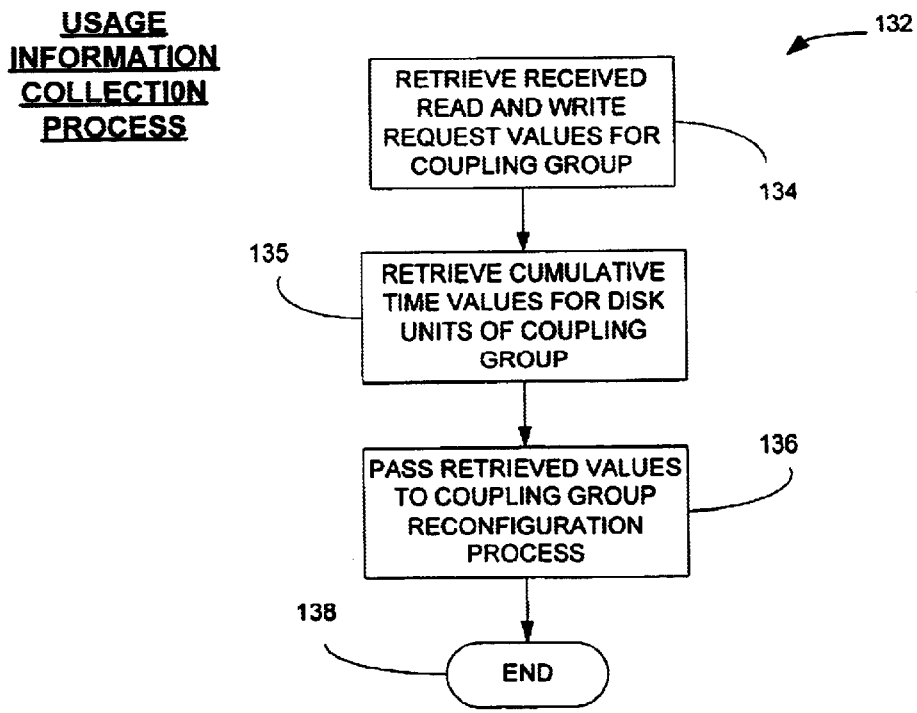
FIG_9

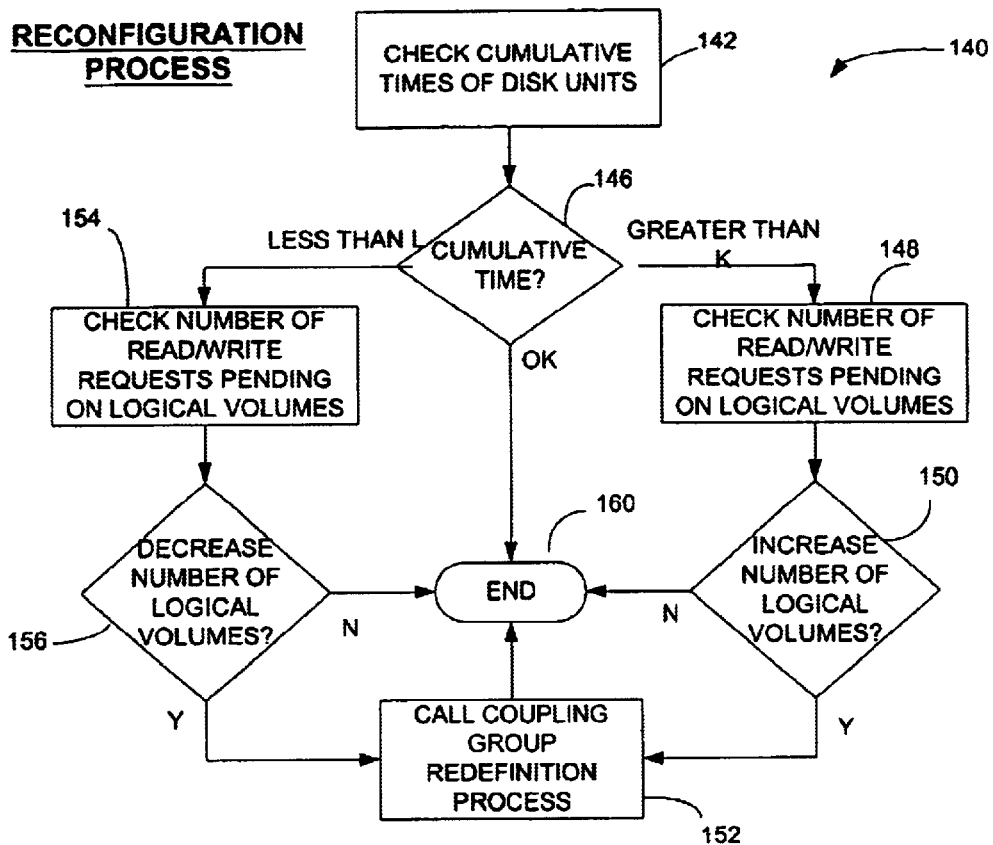
FIG_10
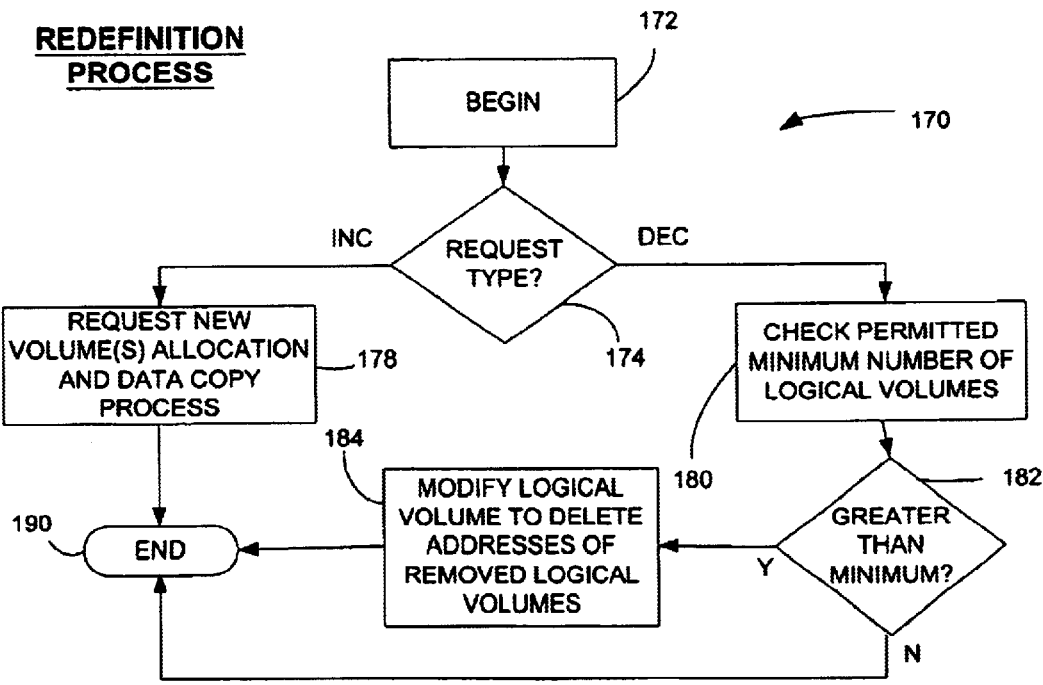
FIG_11

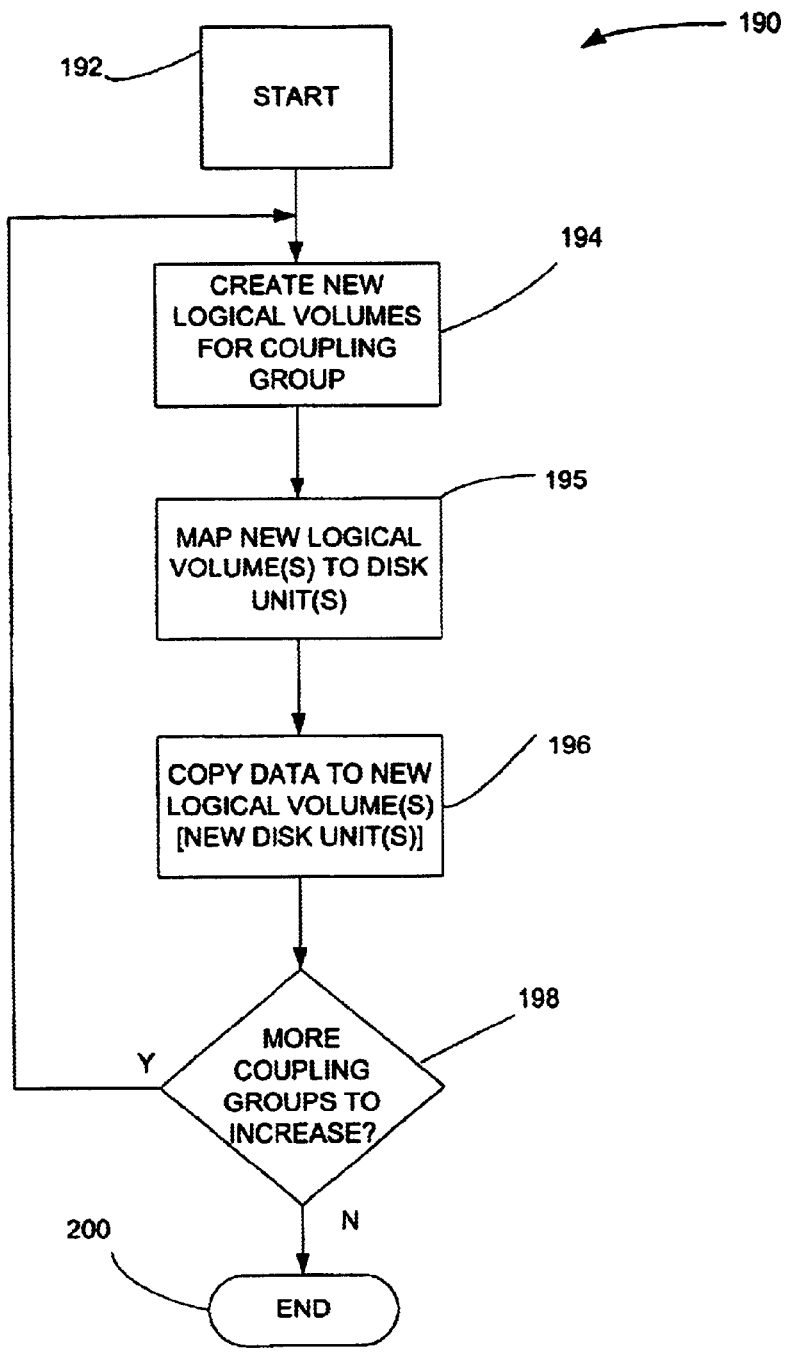
FIG_12

DYNAMIC REALLOCATION OF PHYSICAL STORAGE

BACKGROUND OF THE INVENTION

The present invention is directed to a data storage system for data processing. In particular, the invention is directed to dynamically reallocating physical storage resources for more efficient use.

Today, there is a hunger for information that has given rise to the availability of an almost infinite supply of data maintained by a variety of data complexes and data warehouses for storing and providing access to that data. One form of such a data complex is a computing architecture that will typically comprise a number of data processing systems communicatively coupled to a large data storage facility that is often realized by a large collection of disk storage units because of their ability to provide, among other things, fast access to the stored data.

The growth of Internet use has fed this hunger, and added the requirement, that data be continuously available. Continuous availability desire, if not is most often achieved by many database complexes through resort to such techniques as "mirroring" (i.e. using redundant storage to maintain a copy of everything written to the main storage element), error correction of various types and the like. Redundant arrays of independent (or inexpensive) disks (RAID) is one example. Certain RAID configurations or "levels" protect the stored data by using data striping which spreads the blocks of each file across multiple disks, correcting errors when encountered; however, redundancy is not used. Although performance is improved, fault tolerance is not delivered. Other RAID levels (e.g., level 1) do provide disk mirroring to add data redundancy and thereby fault tolerance.

While these techniques operate well to provide a measure of redundancy and fault tolerance and, therefore, some continuous availability of the stored data, they can be overloaded when there is a database complex is called upon to respond to a large volume of requests for the stored data at one time. Thus, although continuous availability is now a feature of many database complexes and data warehouse configurations, they still can present a performance impediment by limiting the number of accesses that can be made at any particular moment in time.

One approach to improving performance of a disk storage system is provided by the system shown in U.S. Pat. No. 6,108,750, which describes a data storage system that includes a plurality of physical disk units for storing multiple copies of the stored data. I/O read requests received by a controller will be assigned to one or another of the disk units not active (i.e., not then handling an assigned request). If no disk unit in inactive at the time a read request is received, it is held, pending the availability of an inactive disk unit. This approach allows multiple I/O read requests to be serviced in parallel, thereby providing improved response performance. However, a limiting factor is the number of physical disk units available so that a system can be overwhelmed if the number of received I/O read and write requests becomes large.

An extension of this approach is taught in patent application Ser. No. 09/813,281, filed Mar. 20, 2001, for Load Distribution of Multiple Disks (hereinafter, "Referenced Application). The Referenced Application involves use of a logical volume management system by a storage controller to create a number of logical volumes that map to corresponding portions of a physical storage area implemented by physical disk units or other storage medium. The data stored at each mapped physical storage portion mirrors that of the other mapped physical storage portions, again providing performance improvement through parallel servicing of I/O requests. In addition, the extent of the mapped portions of physical storage can be preset so that the entire amount of physical storage can be parsed as needed. This allows the storage system to be set to accommodate a predetermined activity level without being overwhelmed. Unfortunately, it does not allow easy adjustment of the parsing to adjust for changing conditions of activity over time.

BRIEF SUMMARY OF THE INVENTION

The present invention is directed to providing a storage system with the capability of dynamically responding to changes in the input/output (I/O) activity it handles by adjustments that more evenly spread usage across the physical storage area.

Broadly, the invention is implemented in a storage control unit that manages data transfers (I/O read/write requests) between one or more host processor systems and a physical storage area. A preferred aspect of the invention implements the storage area with a number of physical disk storage units where multiple copies of the data are kept and made available for access. According to a broad aspect of the invention, the storage control unit monitors the I/O activity of the disk storage units. If it is determined that one or more of them is experiencing a higher than desired level of activity, the manner of accessing the physical storage is reconfigured to, in effect, create additional copies of the data, thereby making the data more accessible, and more evenly spreading the I/O activity across all disk storage units of the storage area. Conversely, if it is determined that one or more of the individual physical disk storage units is underutilized, the access process may again be reconfigured to, in effect, reduce the number of data copies.

The control unit preferably includes multiple processor units to provide a platform for simultaneously operating multiple processes to concurrently service multiple I/O data requests from the host systems. The control unit employs logical volume management with a number of logical volumes that each map to corresponding portion of the physical storage, thereby operating to parse or divide physical storage into multiple storage portions.

Preferably, the boundaries of each storage portion is a disk unit for ease of implementation, although those skilled in this art will recognized that other boundaries may be employed. For example, a first logical volume may map to 75% of a first disk unit; a second logical volume maps to the remaining 25% of the first unit and 50% of a second disk unit; a third logical volume maps to the remaining 50% of the second disk unit and 25% of a third disk unit; and so on.

I/O read requests, when received from the host systems, are assigned to one or another of the logical volumes which, in turn, map to one or another of the physical storage area portions. I/O write requests are assigned to a specific one of the logical volumes and, thereby, written to the physical storage to which the one logical volume maps. Data on that physical volume is then copied to the rest of physical storage having logical mappings, thereby "mirroring" that data.

According to the present invention, the activity or inactivity of each physical storage area portions (e.g., disk unit) is monitored. If it appears that one or more storage area portions are experiencing more activity than other storage area portions, the logical volumes management reconfigures the logical to physical storage mapping to increase the number of logical volumes and thereby increase the number of available copies of the data. Thus, high volumes of I/O requests can be more evenly distributed so that no one of the storage area portions will be inordinately burdened.

Conversely, should it be determined that one or more storage area portions are experiencing disproportionate inactivity, the reconfiguration of the logical volume division will decrease the number of logical volumes available for handling I/O requests to decrease the number of copies of the data.

A number of advantages are achieved by the present invention. First, is that by providing the ability of dynamically reconfiguring the way physical storage is managed and accessed, the storage system is capable of evenly distributing I/O requests for parallel servicing in the face of changing activity levels. The storage system is able to maintain high operating performance at all times.

An additional advantage is that performance is maintained at a optimum level, matching the loads put of the storage system.

These and other aspects and advantages of the present invention in its various embodiments will become apparent to those skilled in this art upon a reading of the following detailed description of the invention, which should be taken in conjunction with the accompanying drawings.

BRIEF DESCRIPTION OF THE DRAWINGS

FIG. 1 is a simplified block diagram illustrating the storage control system of the present invention for distributing I/O read requests from a number of host processor systems over multiple copies of data maintained by physical storage;

FIG. 2 is a diagram of the logical disk group table, a one of the data structures used to implement a group of logical disk storage devices;

FIG. 3 is a logical volume table, a data structure that identifies, for the corresponding logical volume, the particulars of that volume;

FIG. 4 is a physical disk table, a data structure that identifies the content of a physical disk unit of FIG. 1;

FIGS. 5–8 are flow diagrams illustrating the steps taken by various of the processes used by the storage system of FIG. 1 to respond to an I/O read request and transfer requested data from physical storage to the requesting host system;

FIG. 9 is a flow diagram that illustrates the steps periodically taken to collect information respecting usage of the disk units of a logical coupling group;

FIG. 10 is a flow diagram of the reconfiguration process of the present invention, illustrating the steps taken to decide if usage of the physical disk units to determine if a re-redistribution would more evenly employ the available physical disk unit resources and;

FIGS. 11 and 12 are flow diagrams illustrating the redefinition process for increasing or decreasing the number of logical volumes used for I/O access to the physical disk units of FIG. 1.

DETAILED DESCRIPTION OF THE INVENTION

The present invention preferably operates with a data storage system in which redundant copies of data are stored, using physical storage in the form of a number of physical disk storage units. A storage controller functions to receive I/O data read and write requests and distribute those requests among the physical storage units. A logical volume management system is used to parse physical storage for load distribution. A number of logical volumes are created by the storage controller with each logical volume mapping to different ones of the disk storage units. For example, each logical volume could map to a corresponding one of the disk storage units, multiple physical disk units, or a portion of a physical disk unit. I/O write requests are assigned to a predetermined one of the logical volumes (termed the "master"), and the data of the request written to the corresponding disk unit(s) to which that logical volume maps. That same data is copied to the other logical volumes, and in that way to the corresponding disk units to provide redundant copies of the data. Multiple concurrent I/O read requests can then be serviced substantially simultaneously, improving efficiency. Data redundancy also provides fault tolerance and reliability.

Incoming I/O read requests are assigned to one or the other of the logical volumes, and thereby to the corresponding physical storage, in a manner that distributes the work load of servicing the requests. The above-identified Referenced Application, assigned to the assignee of the invention described and claimed herein, describes in greater detail the various techniques for distributing the I/O read request load across the physical storage for optimum operation of the storage system and the data processing system using it.

The present invention is directed to maintaining optimum use of physical storage by monitoring the activity of each of the physical disk units employed.

Turning now to the Figures, and for the moment specifically FIG. 1, there is illustrated a storage system, designated generally with the reference numeral 10 for handling I/O data communication between a number of host processing systems 12 ($12_1$, $12_2$, . . . $12_k$) and a physical storage 14, comprising disk units 16 ($16_1$, $16_2$, $16_n$). The storage system 10 includes a controller unit 20, with associated memory/cache unit 22, that operates to control data transfers between the host system 12 and the physical storage 14. The controller 20 is preferably realized by a number of individual processor elements (e.g., microprocessors) or similar devices in order to provide parallel processing to allow multiple processes to run simultaneously. For example, the controller 20 may utilize a symmetric multiprocessing (SMP) architecture to exploit the power of multiple processor units through distribution of the operating system and thereby balance the system load of the SMP configuration. In addition, an SMP configuration can provide some fault tolerance and reduce downtime because the operating system can continue to run on remaining processor units in the event one the processor units should fail. Alternatively, a single processing element may be used in time-share fashion to provide virtual parallel processing.

The controller unit 20 maintains a common clock function, represented by the timer 21, for monitoring the activity of the disk units 16 according to an aspect of the present invention. Preferably, for reasons that will become apparent below, timer 21 is used as a real-time clock, although that is not altogether necessary for operation of the invention.

Maintained in the memory/cache unit 22 are data structures that are used to implement a logical volume management system that groups logical volumes in one or more "coupling groups." Each coupling group comprise one or more logical volumes. While there can be any practical number of logical coupling groups, only one, coupling group 30, is shown in FIG. 1 for the sake of simplicity. However, it will be evident the following discussion that other coupling groups may represented by data structures in the memory/cache unit 22. Thus, although only one coupling group is shown in FIG. 1, there can be more than one, each separate from the others, but all under the control of the controller unit 20.

The logical coupling group 30 of FIG. 1 is shown as comprising logical volumes 32 ($32_1$, $32_2$, . . . $32_m$), the number of which will typically be less than or equal to the number of physical disk units 16, i.e., m≦n. Each logical volume will map to a corresponding one or ones of the disk units 16.

One of the logical volumes (e.g., logical volume $32_1$) is designated a "master" volume. All I/O data read or write requests made by a host system 12 are assumed to be directed to the master logical volume $32_1$. In other words the host system or systems 12 see only one storage space in the form of the master logical volume.

The remaining logical volumes 32 ($32_2$, . . . $32_m$) are designated "slave" volumes.

I/O read or write requests that issue from the host systems 12 will include an address at which data is to be written (if an I/O write request) or from which data is to be read (if an I/O read request). I/O write requests use the address contained in the request to map to a corresponding address of the master logical volume 32, and therethrough to the corresponding disk unit or units 16 of the physical storage 14 where the data will be written. The data of the I/O write request will also "written" (i.e., assigned) to each of the other logical volumes $32_2$, . . . $32_m$ of the logical coupling group 30, and similarly mapped and written to the corresponding disk units 16. Thus, multiple copies of data written to, maintained, and made available by the storage system 10 for use by the host systems 12.

As described in the Referenced Application, a received I/O read request will be assigned, according to a load distribution technique, to one of the logical volumes 32 for retrieval of the requested data. Assignment of the request is in a manner that distributes the requests as evenly as possible among the logical volumes 32 for parallel handling.

The Referenced Application describes three variations of load distribution. Briefly, one load distribution method has the controller unit 20 first assigning each incoming I/O read request to one of the logical volumes 32 according to, for example, a round-robin algorithm. (It will be evident to those skilled in this art that other selection methods may be employed.) The address of the data contained in the I/O read request will be mapped from the selected logical volume 32 to an address within its corresponding physical storage 14, and the requested data read from the corresponding physical disk 16.

In a second variation described in the referenced application, a received I/O read request will cause a logical-physical mapping of all logical volumes 32 to first be performed to obtain all the addresses of the various copies of the requested data in the physical storage 14. Then, a determination is made of which physical disk unit should be selected. For example, that selection may be based upon how many outstanding requests each physical disk has, and the I/O read request then assigned to the logical volume 32 corresponding to a physical disk unit 16 capable of handling the request.

Finally, a third variation of load distribution described in the Referenced Application also involves a logical-physical mapping in order to obtain the corresponding physical disk unit addresses of the copies of the data sought by the request. This time, however, less than the maximum number of logical volumes 32, for example only two, are mapped to their corresponding physical storage. Again, as with the second variation, a physical disk 16 carrying a copy of the data is selected, for example based upon how many outstanding requests are pending, for servicing the I/O read request.

For purposes of the present invention, it is not important which load distribution method is used. Other load distribution techniques, using the logical to physical mapping to redundant data carried may benefit from use of the present invention.

FIGS. 2 and 3 illustrate the data structures that are set up and maintained in the memory/cache unit 22 by the controller 20 to define and thereby realize the logical volumes 32. For each coupling group created by the storage system 10 (again, only one of which is illustrated in FIG. 1) there will be a Logical Coupling Group Table 40 illustrated in FIG. 2. As shown, the Logical Coupling Group Table 40, which corresponds to the coupling group 30 of FIG. 1, includes multiple entries that define the logical makeup of a coupling group. Entry 42 identifies the number of logical volumes 32 of the particular coupling group. Next, entry 44 identifies the address of the master logical volume $32_1$. Entry 44 is followed by a number of entries 46 ($46_2$, . . . $46_m$) one for each of the slave volumes 32. The content of each entry 46 is the address of a corresponding slave volume $32_2$, . . . $32_m$. When an I/O read request is received, the address contained in the request will be the address of the target master volume $32_1$. If, however, there are more than one logical coupling groups, the coupling group tables 40 for those coupling groups are searched with address of the received I/O read request to find a matching master logical volume address, thereby locating the coupling group with the desired data.

The entries 46 are followed by a value in entry 48 that identifies the minimum number of logical volumes for this particular coupling group. As will be discussed below, if it is determined that the number of logical volumes should be decreased, the value contained in the entry 48 is the lower limit. The number of logical volumes cannot be decreased below this value.

FIG. 3 illustrates the data structure, a logical volume table 50, that contains the information describing and defining the makeup of a logical volume 32. There will one logical volume table 50 for each of the logical volumes 32 of a logical coupling group. Entry 52 of the logical volume table 50 identifies the mapping type used for storing data of the logical volume on its corresponding physical storage 14. For example, the mapping type may be a RAID 1 or a RAID 5 mapping, or any other mapping type. Entry 54 identifies the total data-storing capacity of the logical volume, as implemented by its corresponding physical storage 14, and entry 55 identifies that physical storage in terms of the number of physical disk units to which the logical volume maps to.

Entry 55 is followed by an entry 56 containing the number of all I/O read requests received and assigned to the logical volume to which the table 50 pertains since a predetermined period of time selectable by a user. Similarly, entry 57 contains a count of the number of all write requests received by the logical volume since the same predetermined period of time.

Following entry 57 are one or more entries 58, one entry for each of the physical disk units that correspond to the logical volume defined by the logical volume table 50. Thus, if the logical volume maps to three physical disk units 16, there will be three entries. Conversely, if the logical volume maps to only one physical disk unit 16, or only a portion of a physical disk unit, there will be only one entry 58.

Each entry 58 identifies each corresponding physical disk unit 16 with three fields $58_a$, $58_b$, and $58_c$, respectively identifying the address of the disk unit used by the logical volume, and the start and end block identifications of the physical block to which the corresponding logical volume is mapped.

Each of the disk units 16 are also defined in terms of their activity by a physical disk table 70 illustrated in FIG. 4. There will be one physical disk table 70 for each one of the physical disk units 16. As FIG. 4 illustrates, the physical disk table 70 includes three entries 72, 74, 76, and 78. Entry 72 identifies the number of requests then pending and/or then being processed by the particular disk unit 16. Entry 74 contains a "cumulative active time" value that is indicative of the actual non-idle time spent by the physical disk unit 16 servicing requests, i.e., writing or reading data. The entry 76 is a value indicative of the time the disk unit 16 switched from an inactive (idle) state to an active (non-idle) state to perform a disk read or write operation in response to a read or write request. Timer 21 is used to develop the cumulative active time value and for the start active time value. The entry 78 (the total number of read/write requests) is value indicative of the total number of read/write requests issued to the physical disk unit 16 since certain time.

Those disk processes relevant to the present invention are represented by the flow diagrams shown in FIGS. 5–8, which run on the multiple microprocessors that make up the controller 20, if in fact multiple processors are used. The illustrated processes handle data transfers in response to read requests issued by the host systems 12. There can be multiple versions of the processes running at the same time in order that there be available parallel data transfer operations between the processor systems 12 and the physical storage 14.

Turning first to FIG. 5, the flow diagram 80 illustrates the principal steps for a read request process. The read request process operates to receive an I/O read request from a host system 12 (step 82) and passes the request to step 84 where a determination of the location of the requested data is made, i.e., whether the data is located in the memory/cache unit 22 or whether it must be retrieved from physical storage 14. If the former, step 84 is left in favor of step 86 in which the request will be passed to the host read transfer process 90 (FIG. 6) which handles reading the memory/cache unit 22 and the transfer of the data to the requesting host system 12.

Referring for the moment to FIG. 6, when step 86 of the read request process 80 passes the request to the host read transfer process, the host read transfer process will, at step 92, execute a transfer of the data to the requesting host by reading the data from the memory/cache unit 22, and transferring it to the requesting host system 12, terminating at step 94.

If it is determined by the read request process 80, in step 84, that the requested data is not located in the memory/cache unit 22, the process proceeds to step 89 where the I/O read request is passed to a load distribution as described above. (See also the Referenced Application.) The load distribution process will assign the request to one of the logical volumes 32 of the coupling group (here, coupling group 30), thereby selecting a corresponding physical disk unit 16, from which to read the data.

When a physical disk unit is selected, the read request disk issue process, illustrated by the flow diagram 100 shown in FIG. 7, is employed. The read request disk issue process begins with step 102 by incrementing the number of received read requests contained in entry 56 of the logical volume table 50 (FIG. 3) for the logical volume 32 to which the request was assigned. Then, in step 104, the process checks to see if the processing request number contained in the entry 72 of the physical disk table 70 (FIG. 4) is zero. If the value is greater than zero, the process will go to step 110 to increment the processing request number to indicate that the selected disk unit 16 is processing an additional request.

If, on the other hand, step 104 determines that the processing number is zero, then the timer 21 is read in step 108, and that time written to entry 76 of the physical disk table (FIG. 4) corresponding to the selected disk unit 16 as the start active time. Step 108, is followed by incrementing the processing request number (entry 72, FIG. 4) by step 110. In step 111, the read request disk issue process 100 increments the total number of read/write request value of entry 78 by 1. Then, in step 112, the read request is issued to the selected physical disk 16. The read request disk issue process then terminates with step 114.

The selected disk unit 16 to which the read request sent in step 112 of the read request disk issue process 100 will respond with the necessary preparations for reading the requested data and issue an interrupt to the controller 20 to indicate that the data is now ready for transfer, as is conventional. This will invoke the disk read transfer process 120, illustrated by the flow diagram of FIG. 8 where, in step 122, the disk unit 16 will transfer the requested data to the memory/cache unit 22. At step 124, the processing request number contained in the entry 72 of the physical disk table 70 (FIG. 4) for the selected disk will be decremented to indicate that the particular disk unit 16 has completed a pending request. Then (step 125) the processing request number value is checked. If it is zero (no further pending requests needing servicing), the process will first proceed to step 126 where the difference between the start active time value of entry 76 (FIG. 4) and the present time, as indicated by the timer 21, is calculated and added to the accumulated time value of entry 74 of the physical disk table 70. The start active time value is zeroed. Then, in step 128, the disk read transfer process 120 will transfer the control to the host read transfer process 90 (FIG. 6) where the data is transferred from the memory/cache unit 22 to the requesting host 12 as described above. The disk read transfer process 120 then terminates at step 130.

As indicated above, data is written by a host system 12 to storage system 10 by addressing the master logical unit $32_1$. That data is then mapped from the master logical volume $32_1$ to its corresponding physical storage 14, i.e., a disk unit or disk units 16. In addition, as also indicated above, that data is copied to each of the slave logical units $32_2, \ldots 32_m$ of the coupling group 30, and thereby to the corresponding disk units 16. Thus, multiple copies of data written to the storage system 10 provide fault tolerance and continuous data availability. The write operations involve the same steps of incrementing and decrementing the processing request number of the disk unit(s) corresponding to the master logical volume, as well as incrementing the number of received write requests 57 for that logical volume.

Over time, each of the disk units 16 will respond to a number of read requests, thereby accumulating an active time value (cumulative active time) that is reflected by the content of entry 74 of the physical disk table 70. Periodically, the controller 20 will initiate an information collection process 132 of FIG. 9, beginning with the step 134 where, for each coupling group, the process will access the logical coupling group table 40 (FIG. 2) of the coupling group to be examined. Using the addresses of the various volumes, as stored in entries 44, 46 of the logical coupling group table 40, the process will retrieve, for each logical volume of the coupling group, the received read and write request values (entries 56, 57; FIG. 3) from the logical volume table 50. Then, at step 135, and using the disk addresses contained in entries 58 for each logical volume of the coupling group, the process will retrieve the cumulative active time values for each disk unit 16 corresponding to each logical volume. The information retrieved by steps 134 and 135 are, in step 136, passed to a coupling group reconfiguration process 140, shown in FIG. 10. The process 132 then ends with step 138.

The reconfiguration process 140 operates to determine whether the number of logical volumes of a coupling group should be increased or decreased, based upon the information collected by the information collection process 132. For example, over time the number of read requests being handled by each of the disk units 16 may increase or decrease. An increase may be indicated by cumulative active time values for one or more disk units being substantial greater then those of the other disk units 16. To alleviate such indicated over-utilization, the number of logical volumes can be increased to, in turn, increase the number of disk units—either by adding disk units to which the increased logical volume coupling group will map to. Or, if one or more disk units are under-utilized, the number of logical volumes can be decreased to, in turn, decrease the number of mappings to the disk units 16.

Accordingly, the information gathered by the information collection process 132 is used by the reconfiguration process 140. First, in step 142, the cumulative times of each of the disk units of a coupling group are examined. If the cumulative time value for one or more of the disk units is found to be greater than some predetermined value, K, as determined by step 146, the reconfiguration process 140 will move to step 148 where the number of received read and write requests of the logical volume(s) corresponding to the over-utilized disk unit(s) are examined by referring to each logical volume table 50 (FIG. 3), which table includes the address of the physical disk units (entries 58) to which the particular logical volume maps. Then, it is decided, in step 150, whether or not to increase the number of logical volumes for the coupling group. This decision is based upon a determination of whether a decrease in the number of read requests will result from a concomitant increase in the number of logical copies of the mirrored data, i.e., an increase in the number of logical volumes. For example, using the values of number of received read requests 56 and number of physical disk units 55 allocated a logical volume, as provided by the logical volume table 50 (FIG. 3), the reconfiguration process 140 will predict that the number of read requests will decrease by an amount N where N=(number of received read requests)/(number of physical disks+1)) If this predicted value is large enough when compared to total number of read/write requests (entry 78; FIG. 4) for the physical disk unit, the process decides to increase the number of logical volumes. And, if the result of the decision-making effort is that the number of logical volumes of the coupling group should be increased, the reconfiguration process 140 will move to step 152 to call the coupling group redefinition process 170 of FIG. 11. If, on the other hand, the decision of step 150 is that it is not feasible at this time to increase the number of logical volumes of the coupling group, step 150 will be left in favor of terminating the process, at step 160.

If the cumulative time for a disk unit(s) 16 is determined, in step 146, to be less than some predetermined value L, then step 154 of the reconfiguration process 140 will again examine the received read and write request values for the logical volume(s) of the suspected underutilized disk unit(s) 16 and a determination is made, in step 156, of whether or not to decrease the number of logical volumes of the coupling group. Step 156 involves predicting whether the number of read requests will not increase too much by a decrease of the number of logical copies of the mirrored data. For example, it predicts that the number of read requests will increase by N1 (where N1=(number of received read requests)/(number of physical disks−1)) If this predicted value, N1, is not too big compared to total number of read/write requests of the physical disk unit, the process will decrease the number of logical volumes. If step 156 finds that the number of logical volumes is to be decreased, step 152 is again used to call the coupling group redefinition process is called. If, on the other hand, the process 140 determines that the time is not right to change the number of logical volumes, the process ends with step 160.

The redefinition process 170 will receive, at step 172 the request to either increase or decrease the number of logical volumes, sent by the reconfiguration process 140. In step 174, the redefinition process 170 will determine if the request is to increase the number of logical volumes, in which case the step 174 will be left in favor of step 178. Conversely, if the request is to decrease the number of logical volumes, step 180 follows step 174.

Assuming that the request is to decrease the number of logical volumes, step 180 will first check entry 48 of the logical coupling group table to determine the minimum number of logical volumes allowed for the particular coupling group. If that minimum number has already been achieved, as determined by step 182, the redefinition process 170 will terminate at step 190 without any decrease of the logical volumes. However, if step 182 determines that the actual number of logical volumes presently defining the coupling group is greater than the minimum, then step 182 will be left in favor of step 184 to modify the logical coupling group table 40 corresponding to the logical coupling group being decreased by deleting one or more of the entries 46. At the same time, the logical volume table for the deleted logical volumes are also removed. The redefinition process 170 will then terminate at step 190 with a coupling group of less logical volumes than before.

If, on the other hand, the check made in step 174 of the redefinition process 170 determines that the request from the reconfiguration process 140 is to increase the number of logical volumes, step 178 will be executed to make a call to a new volume allocation and data copy process, accompanying that request with an indication of the number of new logical volumes to create for the particular coupling group.

The new volume allocation and data copy process 190 will, at step 192, receive the request and, in step 194, create the new logical volume(s). This entails modification of the logical coupling group table 40 by increasing the entry 42 containing the number of logical volumes in the coupling group, and adding the address of the new logical volume or volumes in entries 46. Also, for each new logical volume allocated to the coupling group, a new logical volume table 50 is created identifying the mapping type (entry 52) used for that particular logical volume, the capacity (entry 54), the number of physical disks that the logical volume will map to (entry 55) and the addresses of those physical disks units (entries 58). The latter, providing the addresses of entry 58 to the logical volume table 50 establishes the mapping of the new logical volume to the physical storage, of step 195.

In step 196, the data of the prior logical volumes, which is substantially identical for each logical volume (i.e., as carried by the corresponding disk units 16) is copied to the new logical volumes (i.e., the disk units 16 that they map to). Then, for each disk unit 16 corresponding to each newly allocated logical volume, there is created a physical disk table, initially empty, for the processing request number, cumulative active time, and start time values that will be used.

Finally, in step 198, the process 190 will determine if there are other coupling groups to be increased. If so, a jump back to step 194 will be made; if not, the process terminates at step 200.

What is claimed is:

1. In a storage system for transferring data between a plurality of disk units and at least one processing system, a method for distribution of I/O read requests from the processing system among the plurality of disk units, including the steps of:

establishing a logical volume management comprising a number of logical volumes, each of which stores the same data as the other logical volumes, each of which maps a corresponding one or more of the plurality of disk units;

selecting one of the logical volumes in response to a request to read data from the processing system to read the data from a one of the plurality of disk units corresponding to the selected logical volume;

maintaining values indicative of usage of plurality of disk units; and periodically checking the values to change the number of logical volumes.

2. The method of claim 1, wherein the checking step includes checking the values to decrease the number of logical volumes if the values indicate under-utilization of at least one of the disk units.

3. The method of claim 2, each of the plurality of disk units being operable in an active mode for reading or writing data or an idle mode, and wherein the values include a cumulative active time value indicative of a total time of active mode operation for each of the disk units.

4. The method of claim 2, wherein the checking step includes checking the values to increase the number of logical volumes if the values indicate over-utilization of one or more of the disk units.

5. A data processing system, comprising:

at least one processing system; and a storage system communicatively coupled to the processing system for transferring data in response to I/O requests from the processing system, the storage system including a plurality of disk units and a storage control system, the storage control system including a control unit and a memory having a computer program for causing the control unit to respond to I/O read requests from the processing system by establishing a logical volume management comprising a number of logical volumes, each of which stores the same data as the other logical volumes, each of which maps to a corresponding one or more of the plurality of disk units;

selecting a one of the logical volumes in response to an I/O read request received from the processing system to read the data from a one of the plurality of disk units corresponding to the selected logical volume;

maintaining values indicative of usage of the plurality of disk units; and periodically checking the values to change the number of logical volumes.

6. A multi-processor system comprising:

a plurality of processor systems; and a storage system, including a plurality of disk units, communicatively coupled to the plurality of processor systems for storing data on or retrieving data from the plurality of disk units in response to I/O write or read requests, respectively, the storage system including a control unit and a memory coupled to the control unit, the memory storing a computer program for causing the storage system to distribute I/O read requests from the plurality of processor systems by establishing a logical volume management comprising a number of logical volumes, each of which stores the same data as the other logical volume, each of which maps to a corresponding one or more of the plurality of disk units;

selecting a one of the logical volumes in response to a request to read data from the processing system to read the data from a one of the plurality of disk units corresponding to the selected logical volume;

maintaining values indicative of usage of each of the plurality of disk units; and periodically checking the values to change the number of logical volumes.

7. The data processing system of claim 5, wherein the values include a cumulative active time of each of the plurality of disk units to write or read data.

8. The data processing system of claim 7, wherein the checking step of the computer program includes comparing the cumulative active time for each of the plurality of disk units to a predetermined value.

9. The data processing system of claim 8, wherein the computer program includes the step of increasing the number logical volumes if the cumulative active time for at least one of the plurality of disk units is greater than the predetermined value.

10. The data processing system of claim 9, wherein the computer program includes the step of decreasing the number logical volumes if the cumulative active time for at least one of the plurality of disk units is less than the predetermined value.

11. The multi-processor system of claim 6, wherein the values include a cumulative active time of each of the plurality of disk units in reading and writing data.

12. The multi-processor system of claim 11, wherein the checking performed by the computer program includes comparing the value of each of the plurality of disk units to a predetermined value, and if any of the checked values is greater than the predetermined value, increasing the number of logical volumes and corresponding plurality of disk units.

13. The multi-processor system of claim 11, wherein the checking performed by the computer program includes comparing the value of each of the plurality of disk units to a predetermined value, and if any of the checked values is less than the predetermined value, decreasing the number of logical volumes and corresponding plurality of disk units.

14. The multi-processor system of claim 11, wherein the checking performed by the computer program includes comparing the value of each of the plurality of disk units to a predetermined value to increase the number of logical volumes and corresponding plurality of disk units if the value is greater than the predetermined value or to decrease the number of logical volumes and corresponding plurality of disk units if the value is less than the predetermined value.

15. In a data processing system including at least one data processor and a control unit coupled between the processor unit and multiple disk storage units for communicating articles of data therebetween in response to read and write requests received from the processor unit, the control unit operating to receive a write request to write multiple copies of the data to the multiple disk storage units, a method of dynamically distributing read requests that includes the steps of:

receiving a read request to read data at the control unit;

assigning the read request to a one of the disk storage units having a copy of the data to read the data therefrom;

monitoring each read request assigned to each of the multiple disk storage units; and periodically increasing the number of the multiple disk storage units if the assigned read requests are greater that a predetermined first value.

16. The data processing system of claim 15, including the step of decreasing the number of the multiple disk storage units if the assigned read requests are less than a predetermined second value.

* * * * *